Feb. 15, 1966  M. B. HOLLANDER  3,235,162
FRICTION WELDING

Filed July 2, 1962  4 Sheets-Sheet 1

INVENTOR.
MILTON B. HOLLANDER
BY
Arthur J. Plantamura
ATTORNEY.

Feb. 15, 1966 M. B. HOLLANDER 3,235,162
FRICTION WELDING
Filed July 2, 1962 4 Sheets-Sheet 2

INVENTOR.
MILTON B. HOLLANDER
BY
Arthur J. Plantamura
ATTORNEY.

Feb. 15, 1966     M. B. HOLLANDER     3,235,162
FRICTION WELDING

Filed July 2, 1962     4 Sheets-Sheet 4

FIG. 8

*INVENTOR.*
MILTON B. HOLLANDER

United States Patent Office 3,235,162
Patented Feb. 15, 1966

3,235,162
FRICTION WELDING
Milton B. Hollander, Stamford, Conn., assignor to American Machine & Foundry Company, a corporation of New Jersey
Filed July 2, 1962, Ser. No. 206,714
5 Claims. (Cl. 29—470.3)

This application is a continuation-in-part of co-pending application S.N. 833,339 filed August 12, 1959, now Patent 3,134,278 issued May 26, 1964, in which is disclosed friction welding by deriving the energy for performing the weld from energy stored in the mass of a rotating flywheel.

This invention relates to a method and apparatus for welding workpieces utilizing heat generated by friction as the pieces to be welded are pressed together and rotated with respect to each other and to the articles produced thereby.

The invention is applicable for the joining of metals of all kinds, such as refractory metals, steel, various alloys, cast iron, brass, titanium aluminum and combinations thereof, and including the welding of dissimilar metals, such as aluminum to steel or brass to steel, for example. It is necessary that one of the workpieces should be symmetrical or have an axis of revolution such as studs to plates, bars, tubular sections, and the like and including as well, plastics.

Although friction welding procedures in which two workpieces are rubbed together under pressure until sufficient heat is generated to render the surfaces to be welded plastic or molten are known, the present invention is directed to a novel and improved technique in the art of friction welding in which the energy expended is attuned or correlated to the energy required to reach the desired plastic or molten condition at the surfaces to be welded. The present invention utilizes the concept of storing a predetermined quantity of energy in a flywheel and expending this energy at the workpiece surface in the form of frictional heat to render the surfaces to be welded plastic or molten. The exhaustion of this stored energy is substantially coincident with the attainment of a condition in the joining surfaces of the respective workpieces permitting intermolecular penetration of material so that upon being pressed together a weld is effected between the two pieces. The concept of utilizing this measured quantity of stored energy is such that it greatly simplifies relatively heavy and complicated apparatus such as heavy braking mechanisms and timing controls heretofore considered a necessity in friction welding equipment. The invention further obviates the necessity of a two stage pressure cycle for heating and forging in that the weld is effected simply by engaging the workpieces at a given pressure until the predetermined energy stored in the flywheel is expended.

A feature of this invention is that most of the energy used in making a weld is derived from energy stored in a rotating flywheel rather than directly from a motor driving a flywheel. The energy stored in the flywheel is a predetermined amount of energy. The rotational speed of the flywheel is allowed to decline, while workpieces are rubbed together, to a predetermined extent before rubbing is stopped. After rubbing has stopped the heated workpieces are pressed together and thereafter cooled.

A further feature of the invention is the use of a flywheel, or inertial mass, for storing energy over a period of time which is derived from a motor connected to at least one of the chucks through a clutch. A speed reducing means may be used in combination with the connection of the flywheel to the chuck through a clutch.

A further object of this invention is to provide a welding device which has a lower power requirement. The low power requirement is inherent in the friction welding process. Also, the maximum power demand can be reduced by storing rotational energy in a flywheel over a period of time until it is needed for the relatively short welding cycle.

It is a primary object of the present invention to provide a method of friction welding in which the energy required to effect the weld is stored in a flywheel and thereafter completely expended in heating and conditioning the surface of the material to be welded.

It is a further object of the invention to provide a novel and essentially improved friction welding apparatus in which the welding energy is stored in a flywheel which apparatus requires no braking element or timing control to stop the friction heating between the workpieces.

It is a still further object of the invention to provide a means for accurately attuning the necessary energy stored in a flywheel which is needed to weld workpieces to produce a friction welded article of superior quality.

Additional objects and advantages will become apparent from the more detailed description hereinbelow taken in conjunction with the accompanying figures of the drawing in which:

FIG. 8 shows a modification of the friction welder of FIG. 1.

Figure 1:
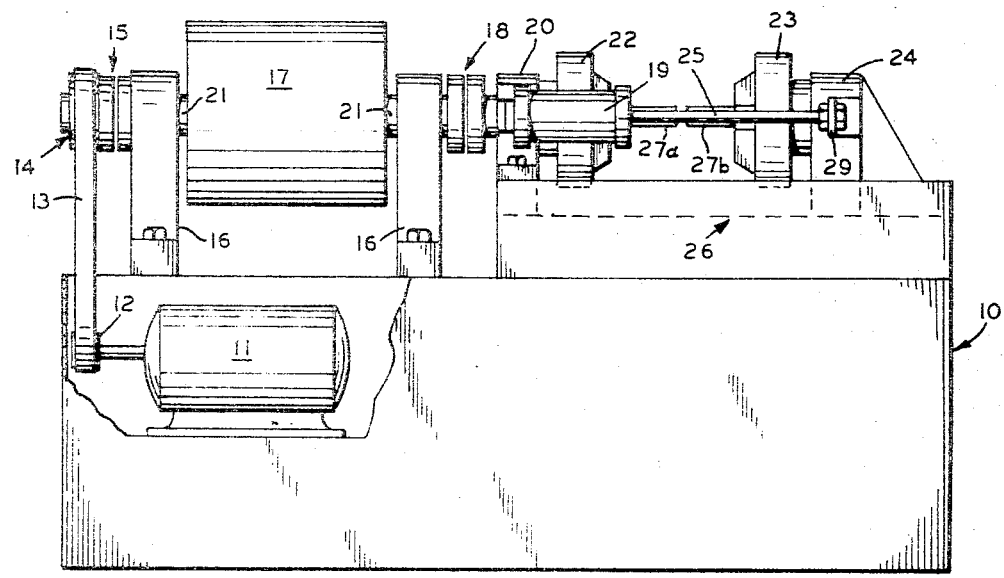
FIG. 1 is a side elevation of a friction welding apparatus useful in conjunction with the invention.

The principle underlying the present invention is that, in the joining of metallic elements, the ultimate temperature necessary for intermolecular penetration of one element with that of another to effect a homogeneous integral structure is produced by friction. The material referred to in the specification is metal but it is apparent that all thermoplastic materials may be welded by this method.

The invention involves a method for causing the homogeneous union of separate metallic elements to form an integral structure, according to which the temperature of the metals at the surfaces is raised by frictionally developed heat to a point at which fusion and intermolecular penetration occurs, so that the metallic elements on cooling are bonded homogeneously and integrally one with the other.

The flywheel friction welding concept according to the invention involves storing the requisite amount of welding energy in a rotating mass, and consuming all the stored energy as the weld is completed so that stoppage of the rotating mass may be made to precisely coincide with or substantially coincide with completion of the weld. In substance, it is proposed that a flywheel be used as the mechanical equivalent of a condenser as in discharge welding.

In using a flywheel for welding in keeping with the invention, a balance must be maintained for a particular set of workpiece conditions between the total energy stored in the system and the speed and inertia of the rotating mass.

If an over-abundance of energy is stored in the flywheel, the weld may fracture on cooling or there may be excessive upset and metal displacement which lowers the quality of the welded joint. Such disadvantages occur in conventional friction welding processes if the brake is not applied to workpiece immediately upon completion of the weld.

If insufficient energy is stored in the flywheel, the workpiece may seize or weld prematurely. If sufficient energy is stored, but the mass moment of inertia of the flywheel is too high, and consequently rotating too slowly, then the rate at which energy can be drawn from the flywheel may not satisfy the conditions for welding. Likewise, conditions for welding are not satisfied when the mass moment of inertia of the flywheel is too low and its speed is too high.

As a consequence of the technique utilized, friction welders in accordance with the invention in which the weld is completely coincidentally with, or substantially concurrently with, the expenditure of energy stored in a flywheel are relatively simple in construction, inexpensive to build, economical to operate and expeditious in function. Rapid braking methods are not required and, due to the intermittent nature of the welding operation, small sized motors can be used to charge up flywheels while a welded piece is being removed from the apparatus.

Moreover, while in conventional friction welding it has been necessary to utilize a first pressure between the two workpieces to be welded in order to generate sufficient heat to plasticize or melt the welding surfaces and a second increased surge of pressure to consummate the weld and forge the pieces together, utilization of a flywheel in accordance with the present invention permits use of a single welding pressure in place of a two-stage heating and upsetting pressure system. This permits the use of simple springs, levers, or air cylinders to apply the load as well as conventional hydraulic means. A single machine can be made to handle a wide range of materials and sizes by adding inertia or changing speeds. It is also important to recognize that the flywheel is the timing circuit and stoppage of rotation coincides with completion of the weld so that the timing mechanism and brake arrangement which are essential in conventional welding machines are obviated in the apparatus of the invention which uses a flywheel. In conventional friction welding which incorporates a timing control, if the surfaces to be welded are not clean, a significant part of the friction period may be expended in cleansing the surface, frequently resulting in an inferior weld. The effects of an unclean surface in a system using a flywheel would be insignificant because no substantial part of the kinetic energy stored in the flywheel would be converted to heat until the surfaces are cleaned.

Apparatus which may be usefully employed in practicing the invention will be described in conjunction with the figures of the drawing.

Figure 2:
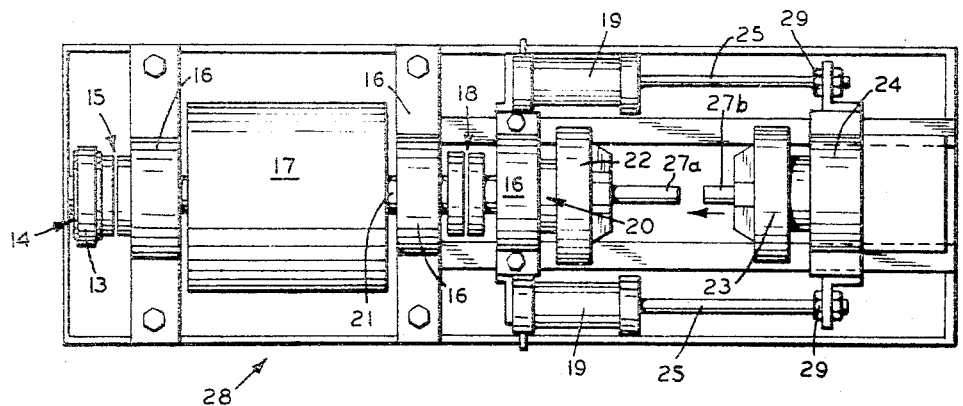
FIG. 2 is a top plane view of the apparatus.

Referring in detail to FIGS. 1 and 2, an apparatus suitable for effecting friction welding according to the invention in which welding energy is stored in a flywheel is illustrated. On the support 10 are suitably arranged in operable relationship a motor 11 connected through motor pulley 12 and timing or V-belt 13 and torque tube pulley 14 to drive to a hollow torque tube 21. A clutch 15 is conventionally adapted so as to engage and disengage the drive from the motor 11 to the torque tube 21. It will be understood that a conventional centrifugal clutch (not shown) may be employed in conjunction with the flywheel to disengage the motor when the flywheel reaches the desired speed. This installation permits charging the flywheel to any desired speed providable by the motor regardless of the running speed of the drive motor. Suitably supported on the torque tube 21 in fixed relationship therewith is the flywheel 17 positioned between bearing pillow block supports 16. A second clutch 18 is employed to engage and disengage a spindle 20 and workpiece carrying rotary chuck 22 with the flywheel supporting torque tube 21. A rotary chuck 22 secured to spindle 20 is employed to hold the first of two workpieces 27a to be joined to a second workpiece 27b held in the non-rotatable chuck 23. So as to hold the workpieces in proper pressure relationship to each other to effect the welding a suitable pressure apparatus of conventional design such as pressure cylinders 19, either of the hydraulic or pneumatic type are utilized. Upon actuation, the cylinders 19 acting through the piston rods 25 which are appropriately secured at 29 to a back-up plate and chuck support 24 force the workpieces 27a and 27b together under suitable welding pressure. To permit movement of the chuck support 24 suitable machine ways 26 are provided.

The operation of the apparatus above described is as follows: Workpieces 27a and 27b are fixed in the rotating and non-rotating chucks 22 and 23, respectively. The motor 11 is started and the clutch is engaged to rotate the flywheel (or optionally the motor is started with the clutch 15 engaged) until sufficient energy is stored in the flywheel to weld the workpieces. The clutch 15 is disengaged and the clutch 18 which drives the rotating chuck holding piece 27a is engaged. At the same time, the rods 25 are actuated by the pressure cylinders 19 to draw the workpieces together. As the energy stored in the rotating mass of the flywheel is consumed, the surfaces of the workpieces are heated through friction to a plastic or molten condition at the welding interface. The coefficient of friction increases as the mass slows so that stoppage of the flywheel coincides with the completion of the weld. When the flywheel has stopped, the clutch 18 is disengaged and clutch 15 connecting the motor 11 to the flywheel is engaged permitting the build-up or storage of energy in the flywheel 17 while the now welded workpiece 27 is removed and another pair of workpieces to be welded are secured in the rotating and non-rotating chucks 22 and 23, respectively. The welding cycle as described hereinabove is then repeated with a minimal amount of lost time. It is thus seen that the method and apparatus of the invention affords a novel and substantially simplified arrangement for the friction welding of workpieces.

Figure 3:
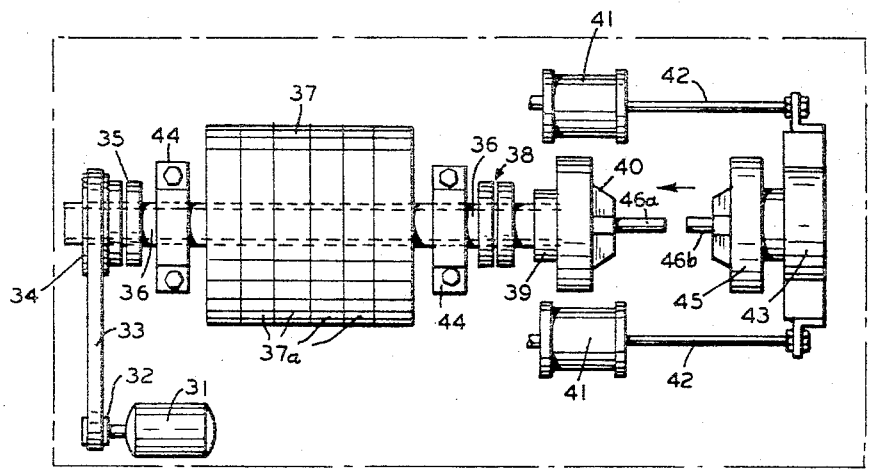
FIG. 3 is an apparatus of modified arrangement in which the energy stored by the flywheel, which comprises a plurality of engagable sections, may be varied by varying the mass of the flywheel to attune the kinetic energy stored to that required for effecting the weld of workpieces of various sizes or compositions.

Referring now to the arrangement of FIG. 3, an apparatus similar to that described in FIGS. 1 and 2 is illustrated with the exception that a variable inertia flywheel, i.e., a flywheel with a plurality of segments, is employed in place of a single segment wheel. The arrangement comprises a combination of elements including a motor 31 which drives torque tube 36 through the conventional arrangement of motor pulley 32 timing or V-belt 33, torque tube pulley 34 and clutch 35. Supported in selectively fixed relationship on the torque tube 36 which tube is in turn supported by bearing supports 44, is the variable inertia flywheel 37 comprising a plurality of segments 37a. One or more of the flywheel segments 37a is selectively fixed to the torque tube depending on the quantum of rotating mass desired for the workpieces to be welded. Any suitable arrangement may be employed to couple and disengage one or more of the segments 37a together or to the torque tube 36. Clutch 38 functions similarly to clutch 18 shown in FIG. 2 to engage the spindle 39 rotating chuck 40 which holds workpiece 46a. The arrangement of pressure cylinders 41 and rods 42 secured to the back-up plate and non-rotating chuck support 43 function in a like manner as the corresponding elements similarly illustrated in FIG. 2.

In operation, the arrangement of FIG. 3 follows that generally described for the embodiment of FIGS. 1 and 2 with the exception that the energy stored in the flywheel 37 may be varied depending on the number of segments 37a coupled to the torque tube 36. Upon reaching the preselected speed for the chosen mass, the clutch 35 is disengaged and the flywheel with its kinetic energy is coupled through clutch 38 to rotate the workpiece 46a. Through the pressure cylinder arrangement, the workpieces are joined together in frictional relationship and as the energy is expended from the flywheel, the surfaces of the rotating piece 46a and stationary piece 46b are rendered plastic or molten and joined through intermolecular penetration. When the flywheel has stopped, the weld is complete. Thereupon, clutch 38 is disengaged and clutch 35 engaged to again store energy in the flywheel for the next weld while new workpieces are inserted in the chucks 40 and 45.

Figure 4:
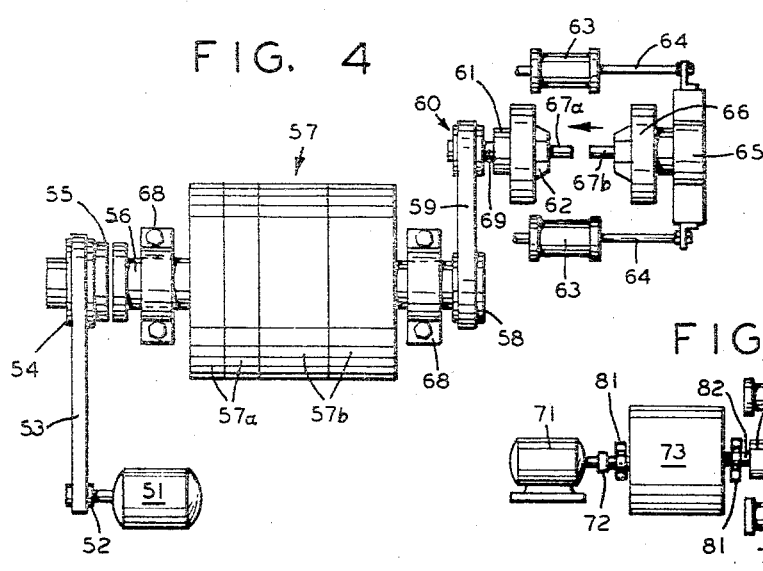
FIG. 4 is still a further modification of an apparatus which may be utilized in practicing the invention in which the flywheel arrangement is displaced from the main shaft upon which the workpieces are mounted.

In the embodiment of FIG. 4, the arrangement is modified over the apparatus hereinabove described in that the torque tube, i.e., the flywheel shaft is offset from axial alignment as presented in FIGS. 2 and 3. In connection with some welding operations, as where the workpiece is small as distinguished from a long workpiece requiring support afforded through the hollow torque tubes of FIGS. 2 and 3, the arrangement of FIG. 4 may offer some advantage of expedition. Also, this arrangement permits welds to be made in cases where the kinetic energy of a high speed flywheel is required while the surface sliding speed must be rather low, or in cases where the rotation speed must be lower than the speed of the flywheels, e.g., in the welding of thin-walled tubes.

As shown, motor 51, through motor pulley 52, drive belt 53 and torque tube pulley 54, is arranged to drive torque tube 56. The flywheel 57 comprises four segments, two 56a of which are relatively smaller than the other two 57b and any of which may be selectively coupled to the torque tube to supply a predetermined kinetic energy to effect a weld in workpieces secured in the rotating and non-rotating chucks 61 and 66, respectively. Bearing supports 68 for the torque tube 56 are suitably arranged to support the flywheel 57. The kinetic energy from flywheel 57 is transmitted from pulley 58 on torque tube 56 through belt 59 to a pulley 60 secured to and arranged to drive the hollow rotary shaft 69. The shaft 69 carries spindle 61 and rotating chuck 62 in which one of the workpieces 67a is secured preparatory to welding. The arrangement of pressure cylinders 63, piston rods 64 and the back-up plate and non-rotating chuck is similar in function to the corresponding configuration described in FIGS. 2 and 3 functioning to press the workpiece 67b held by the non-rotating chuck 66 against workpiece 67a in the direction of the arrow. If desired a second clutch (not shown) may be interposed either on the torque tube 56 or on the drive shaft 69.

In the operation of the arrangement of FIG. 4, upon insertion of the workpieces in the chucks 62 and 66, the flywheel is brought up to suitable rotating speed until the predetermined kinetic energy is stored and thereafter drive pulley 54 from the motor is disconnected. The pressure cylinders are then actuated to force workpiece 67b against 67a. During the interval required to exhaust the kinetic energy from flywheel 57, sufficient heat has been generated at the interface of pieces 67a and 67b to render it plastic or molten. The pressure provided between the workpieces by means of cylinders 63 through rods 64 affords the necessary force to weld the heated workpieces.

Figure 5:
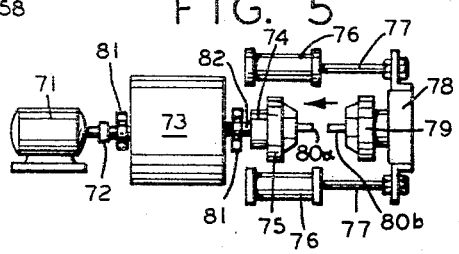
FIG. 5 shows the simplest version of a flywheel friction welder in which the motor can be disconnected from the power line and run down with the flywheel. The armature inertia in this case is added to that of the flywheel.

The arrangement illustrated in FIG. 5 illustrates an apparatus comprising the more basic elements utilized in practicing the invention. As shown, FIG. 5 includes a motor 71 suitably coupled as by a clutch 72 to a torque tube or shaft 82, upon which is suitably supported with the aid of bearing supports 81, a flywheel 73 of suitable dimension and mass to provide the appropriate energy storage capacity to effectively weld workpieces 80a and 80b. The workpieces 80a and 80b are secured in the rotating and non-rotating chucks 75 and 79, respectively. The arrangement and function of pressure cylinders 76, piston rods 77, and back-up plate and chuck support 78 are like the similarly described arrangements in FIGS. 2, 3 and 4. In the arrangement shown in FIG. 5, once the workpieces 80a and 80b are secured and the flywheel has attained the suitable predetermined rotation to provide the desired kinetic energy, the motor may be electrically disconnected and permitted to rotate with the flywheel in the welding cycle or it may be disengaged at 72; consideration being given to the kinetic energy offered by the motor armature. The pressure mechanism, i.e., cylinders 76 and rods 77 are then actuated to press the workpieces into frictional engagement. Upon expenditure of the kinetic energy, sufficient heat has been generated through friction and adequate pressure applied to effect a weld of the workpieces.

While in the description hereinabove, pressure of the workpieces together has been provided by a cylinder and piston arrangement, it will be apparent that any means suitable for exertion of adequate pressure for the workpieces to be welded may be used in lieu thereof, due consideration being given to the size of the workpieces to be welded. For example, springs, levers or jack screws may be employed to exert the required pressure.

The following example in which an apparatus similar to that of FIG. 5 is used illustrates the utilization of the invention:

Steel workpieces were welded using approximately 2,800 ft.-lbs. of energy stored in the rotating elements of the welder whose inertia is about 0.035 slug-ft.², A ⁷⁄₁₆ in. diameter, 1020 steel stud was rotated at an angular speed of 3840 r.p.m. which produced a peripheral speed of 7.3 f.p.s. A 35,400 p.s.i. contact pressure was applied at the instant the workpieces were brought into frictional engagement for welding. The weld was completed (rotation of the flywheel stopped) in 0.7 sec. The rotating mass of the flywheel under the stated conditions supplied energy at a rate of about 50 H.P. per sq. in. to the pieces being welded during 0.7 sec. The heat affected zone was confined to a flat, thin band about ⅟₃₂ in. wide which indicates that the energy was efficiently used. The material immediately adjacent to the weld was unaffected by the welding process.

While the selection of a properly dimensioned flywheel and its rotation at suitable speeds to give suitable welds for a given pair of workpieces may be obtained by trial and error, i.e., by the resulting effect on the workpieces welded as, for example, by the amount of upset material, a more appropriate determination may be obtained through calculation. Figures of the accompanying drawing and the formulae which follow are provided as a more specific disclosure to aid one skilled in the art in the manner and process of utilizing the inventive contribution.

Figure 6:
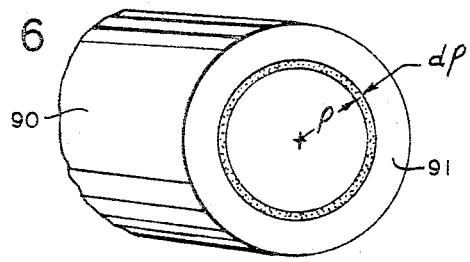
FIG. 6 is a diagrammatic illustration of the end portion of a workpiece and an elementary area on the friction plane of a surface to be considered in conjunction with formulae set forth hereinafter for the purpose of more fully describing the attributes of the invention.

FIGURE 6 is a diagram showing a workpiece 90 and an elementary area on the friction plane 91 over which heat is developed at the butt end of a solid bar. A simple analytical expression for the friction force acting on the incremental area $dA$ at the weld interface, $dA = 2\pi \rho d\rho$, is given by the expression:

$$dF = 2p f \pi \rho d\rho \qquad (1)$$

wherein $dF$ is the incremental friction force; $p$ is the unit pressure; $f$ the coefficient of friction; $\pi$ is 3.1416; $\rho$ is any given radius in the cross-section of the workpiece; and $d$ the incremental change in radius.

The incremental power $dP$ released during welding over this area is given by the expression:

$$dP = 4\pi^2 p f n \rho^2 d\rho \tag{2}$$

wherein $n$ is the angular speed in r.p.m.

Figure 7:
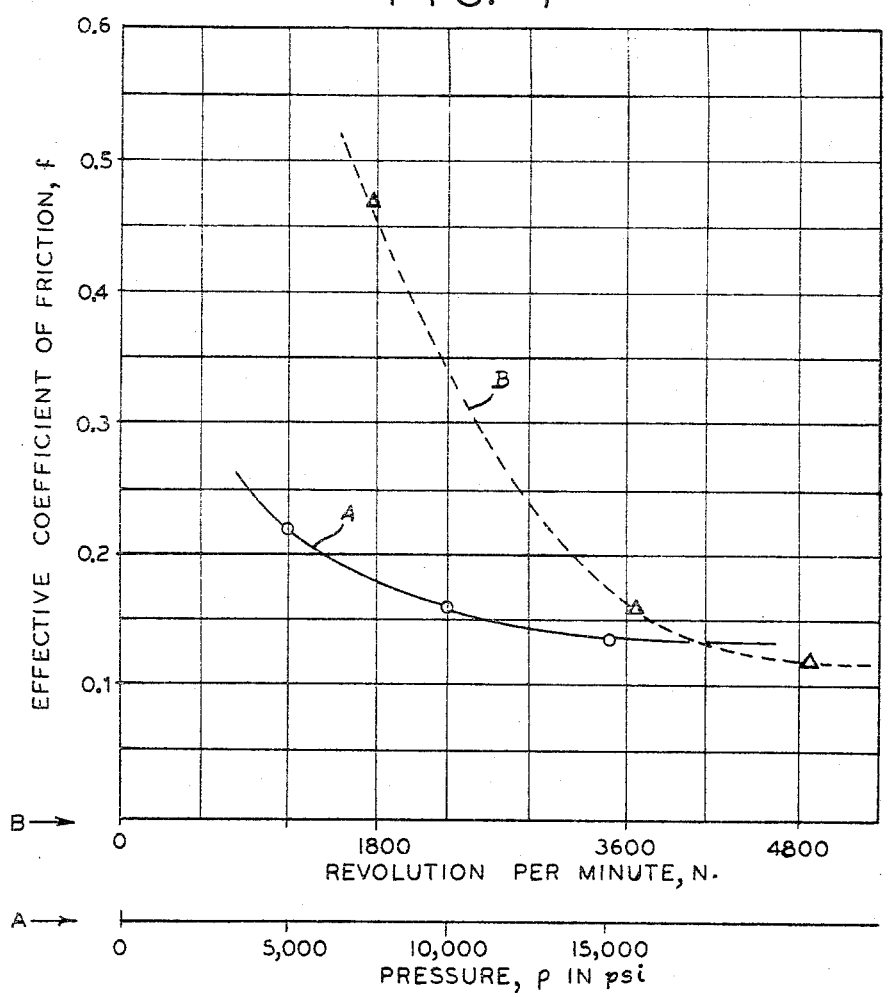
FIG. 7 is a graph illustrating effective co-efficient of friction as a function of rotational speed and pressure.

FIG. 7 is a graph of the effective coefficient of friction as a function of rotational speed and contact pressure for ⅜ in. diameter bars of AISI 4140 steel welded to type 304 stainless steel. The curves of effective coefficient of friction as a function of contact pressure or rotational speed are for surfaces heated to the steady state condition. The abscissa A shows how variations in contact pressure affect the coefficient of friction, and the abscissa B shows how the coefficient of friction decreases as the rotational speed increases. In FIG. 7, the coefficient of friction $f$ of these workpieces was measured at various rotational speeds and pressures and found not to be constant. Although the coefficient of friction may be averaged for some rough calculations, it is a variable which is dependent upon surface sliding speed, pressure, temperature, etc. However, for steady state conditions, the coefficient of friction $f$ is mostly affected by speed of rotation and can be written as $$f = k/(2\pi nR)^x \tag{3}$$

wherein $k$ is a constant whose value is determined by experiment and $x$ is some number greater than zero. If a solid bar is to be welded, $R$ is the radius of the workpiece. If a tube or pipe or other geometry is to be welded, then $R$ represents the equivalent radius of the workpiece at the friction plane. For the present calculations, $x$ is considered between 0 and 2 as observed by experimentally measuring the coefficient of friction and plotting curves similar to FIG. 7 and observing their shape.

By replacing $f$ with $k/(2\pi nR)^x$ in Eq. 2 and integrating over the cross-section, the following representative expressions are obtained for the power consumed during welding. These illustrate how the power consumed during welding depends upon the character of the coefficient of friction. These expressions are identified as Case I, Case II, and Case III for assumed values of $x$ of 2, 1 and 0.

Case I  $p = pkR/n$ if $x=2$, i.e., $f = k/(2\pi nR)^2$  (4)

Case II $p = \pi pkR^2$ if $x=1$, i.e., $f = k/(2\pi nR)$  (5)

Case III $p = \frac{4}{3}\pi^2 pkR^3 n$ if $x=0$, i.e., $f=k$  (6)

These expressions illustrate the necessity of countering the slope of the coefficient of friction curve with the slope of the energy storage curve of a flywheel in such a way as to attune the two systems together to effect complete utilization of frictional energy to provide an optimum weld substantially coincidental with exhaustion of kinetic energy from the flywheel.

The flywheel equation is $$K.E. = 2\pi^2 I n^2 \tag{7}$$

where, K. E. is the kinetic energy stored in the flywheel, ft.-lbs.; $I$ is the inertia of the flywheel, slug-ft.$^2$; and $n$ is the angular speed of the flywheel, r.p.s.

To illustrate, it will be assumed that a simple, disc-type flywheel is used having for its inertia $$I = \frac{1}{2}\frac{w}{g}r^2 \tag{8}$$

where, $w$ is the weight of the flywheel, lbs.; $g$ is the gravitational constant, 32.2 ft./sec.$^2$; and $r$ is the radius of the flywheel, ft.

It should be noted that the flywheel, Equation 8, states that the power stored in the flywheel is proportional to the square of its speed. Since the coefficient of friction increases faster than the speed of rotation decreases as shown in FIG. 7, a combination of circumstances takes place to cause a rapid discharge of energy. This results in the flywheel being rapidly decelerated and stopped without the need for a separate braking system.

The total energy required to make the weld equals the frictional heating power multiplied by the welding time. This is set equal to the energy stored in the flywheel. For Cases I, II, and III, the equations describing the welding time $t$ can be written as:

Case I $\left(\dfrac{pkR}{n}\right)t = \pi^2\dfrac{w}{g}n^2r^2$ or $t = \pi^2\dfrac{w}{g}\cdot\dfrac{n^3r^2}{pkR}$  (9)

Case II $(\pi pkR^2)t = \pi^2\dfrac{w}{g}n^2r^2$ or $t = \pi\dfrac{w}{g}\dfrac{n^2r^2}{pkR^2}$  (10)

Case III $\left(\dfrac{4}{3}\pi^2 pkR^2 n\right)t = \pi^2\dfrac{w}{g}n^2r^2$ or $t = \dfrac{3}{4}\dfrac{w}{g}\dfrac{nr^2}{pkR^3}$  (11)

where $t$ is the welding time.

To further illustrate the advantages of the invention a series of experiments were carried out in which friction welds made using a conventional drive and braking friction welding arrangement and compared to those made by the flywheel method. Butt welds were made between ⅜ in. diameter bars of AISI 4140 alloy steel and SAE 304 stainless steel. For the conventional case, the following parameters were required:

Speed, $n = 60$ r.p.s.
Welding time, $t = 10$ secs.
Contact pressure, $p_1 = 5,000$ p.s.i., during heating (10 secs.)
$p_2 = 20,000$ p.s.i., during forging (after rotation stops)

During the heating phase, 6,600 ft.-lbs. of energy were converted to heat at the weld plane. This is equivalent to an average energy rate of 660 ft.-lbs./secs.; therefore, about 11 H.P. per sq. in. is required to weld the material during the 10 second interval.

On the other hand, when the flywheel of the invention is used, it is only required to use 2685 ft.-lbs. of energy which is less than ½ the regular amount. The weld is completed in only 2.0 seconds. Less energy is required because the cycle time is much shorter; and there is less opportunity for the heat, which is developed by friction, to be carried away by conduction. The 2685 ft.-lbs. of energy was stored in an inertia mass of 0.038 slug-ft.$^2$. For the purpose of calculation, this is equivalent to a simple 6 in. diameter disc-type flywheel weighing about 40 lbs.

Initial speed, $n=60$ r.p.s.
Inertia of flywheel, $I=0.038$ slug-ft.$^2$
Measured welding time, $t=2.0$ secs.
Contact pressure, $p=10,000$ p.s.i. during heating and forging According to the manner in which the coefficient of friction behaves as a function of rotational speed as shown in FIG. 7, Case I seems to apply most closely for these materails. Consequently, it is possible to estimate the welding time, $t$, for this situation beforehand provided $k$ is known. The value for $k$ can be calculated from Eq. 3 and FIG. 7 where:

$$k = f(2\pi nR)^2 = 5.5$$

and wherein $f=0.16$; $n=60$ r.p.s.; and $R=\frac{1}{64}$ ft.

Substituting this information into the Eq. 9 for Case 1 and using the proper units, the time, $t$, to make the weld is obtained.

$$t = \pi^2\frac{w}{g}\cdot\frac{n^3r^2}{pkR} = 1.4 \text{ secs.}$$

where: $w=40$ lb., the equivalent weight of the flywheel; $n=60$ r.p.s., the initial speed of the flywheel; $r=\frac{1}{4}$ ft., the equivalent radius of the flywheel; $R=\frac{1}{64}$ ft., radius of the workpiece; $p=10,000$ p.s.i.; and $k=5.5$.

The 2.0 seconds welding time checks closely with the 1.4 seconds estimated value and shows that the conditions occur as described. During the 2.0 seconds, energy is developed at the weld plane at a rate of 27 H.P. per sq. in. as compared to 11 H.P. per sq. in. by the conventional method. The welds obtained by the flywheel method are equal or better in all respects to the best obtainable by conventional friction welding methods. Because the heat is produced rapidly and is localized, it is possible to join materials of different melting points and physical properties such as aluminum to steel.

FIG. 8 and the description thereof disclose concepts of flywheel friction welding derived from my copending application Serial No. 833,339 of which this application is a continuation in part.

In place of a stationary chuck fixed to frame member 122, a rotary chuck 145 is fixed to a hollow shaft 146 which may accommodate a length of drill pipe 147 within it. The drill pipe 147 is gripped by the chuck 145 and may be rotated by a first motor 148 which drives the first shaft 146 by means of pulleys 149 and 150 and a belt 151. A suitable first clutch 152 divides the first shaft 146 which also has a first brake 153 fixed to it. On ways 154, which may be similar to those of a lathe bed and which may be built to swing into and out of position, there is mounted a tool holder 155 on the saddle 156. A low speed second motor 157 may drive the spindle 158 through the pulleys 159 and 160 and the second clutch 161. A high speed third motor 162 may turn the second shaft 163 through the pulleys 164 and 165 which step up the speed of the second shaft 163 from that of the third motor 162. A flywheel 166 of considerable mass is mounted on the second shaft 163. A third clutch 167 allows the second shaft 163 to drive the speed reducing pulleys 168 and 169 so that the spindle 158 turns at a lower rate of speed than the flywheel 166. A second brake 170 is mounted on the second shaft 163 beyond the pulleys 168 to stop the spindle 158.

In the operation of this embodiment of the invention a piece of drill pipe 147 which is also equivalent to a drill collar is fixed in the chuck 145 within the first shaft 146. The length of the drill pipe 147, which extends far beyond the shaft 146 may be held for rotation by enough supports 171 to prevent the drill pipe 147 from whipping as it turns. A tool joint 172 is placed in the chuck 129. If the clutches 152 and 161 are engaged, the first and second motors 148 and 157 can rotate the tool joint 172 and the drill pipe 147 at a slow speed, for example about 100 r.p.m. This allows the tool holder 155 to be run in with the hand wheel 173 to face off both the drill pipe 147 and the tool joint 172. This ensures matching and alignment of these turned off faces when they are thereafter brought together for friction welding.

If the first and second clutches 152 and 161 are then disengaged, the drill pipe 147 may be held static and locked with the brake 153. If the third motor 162 is allowed to run for a short time, it can store considerable energy in the flywheel 166. Through the third clutch 167 this motor will also rapidly rotate the spindle 158. By activating the hydraulic cylinder 30, the rapidly rotating tool joint 172 is forced against the stationary drill pipe 147 with the thrust bearings 143 and 174 taking up the force. When the proper conditions have been reached, the weld can be completed as the third clutch 167 is disengaged and the second brake 170 is applied to stop the relative rotation of the tool joint and the drill pipe. Higher pressure may be applied and maintained by the hydraulic cylinder 130 to force excess melt out of the weld zone just after the brake is applied.

It has been found that the actual power required while making such a weld will be about 10 horsepower per square inch of weld surface. Since this power is not needed for more than 20 or 30 seconds, and several minutes may be required between welds to chuck up new workpieces, a lower horsepower third motor 62 may be used if it stores energy for the period of dead time in a flywheel. If a 200 H.P. motor would be needed to weld a 20 square inch joint on a drill pipe, a suitable flywheel can readily reduce this power requirement to a 50 H.P. motor with the great resulting saving in motor weight. This is an important consideration in a mobile unit for use in the field. During the actual weld cycle, the maximum speed of the flywheel and the spindle will fall off as the welding takes energy from the flywheel, but the initial speed must be high enough to allow for this reduction. Although a smaller flywheel may be used to store the required amount of energy if it is turned faster than the spindle as shown in FIG. 8, a larger flywheel could be mounted directly on the spindle on non-mobile machines.

The term "flywheel" as used herein contemplates any mass rotating about an axis such that it effectively has a mass moment of inertia, including discs, spoked wheels, flyballs, etc.

It will be apparent to those skilled in the art that various modifications may be made in the invention without departing from the scope of the invention. Accordingly, the invention is not to be limited by various specific details set forth primarily to provide a full, clear and exact description except insofar as necessitated by the appended claims.

I claim:

1. In a method of welding at least two workpieces by friction the steps of:
    (a) mounting each workpiece in a welding device;
    (b) coupling one workpiece through a chuck to a flywheel;
    (c) driving said flywheel by a motor;
    (d) relatively rotating and rubbing together and heating said workpieces until welding heat sufficient to make a weld is developed at engaged workpiece surfaces from energy stored in said flywheel;
    (e) drawing most of the energy used to heat the workpieces in making a weld from energy stored in said flywheel;
    (f) stopping rotation of the workpieces;
    (g) pressing the heated workpieces together; and
    (h) cooling the workpieces.

2. In a method according to claim 1, the improvement in which the rotational speed of the flywheel is allowed to decline during rubbing to a predetermined extent before rubbing is stopped.

3. In a method according to claim 1, the improvement in which: after energy is imparted to the flywheel from a coupled rotating motor the flywheel is uncoupled from said motor.

4. In a method according to claim 1, the improvement in which the workpieces are uncoupled from said flywheel before rotation of said workpieces stops and said flywheel continues to rotate.

5. The method of welding at least two workpieces by friction comprising the steps of:
    (a) securing each of said workpieces in a chuck;
    (b) interconnecting a flywheel to a motor and imparting to the flywheel a predetermined amount of energy sufficient to make a weld;
    (c) disconnecting said motor from said flywheel;
    (d) engaging the flywheel and a workpiece holding chuck; and
    (e) relatively rotating and rubbing said workpieces together to make a weld from said predetermined energy in said flywheel.

(References on following page)

References Cited by the Examiner

UNITED STATES PATENTS

| | | | |
|---|---|---|---|
| 463,134 | 11/1891 | Bevington | 29—470.3 |
| 2,795,039 | 6/1957 | Hutchins | 29—470.3 |
| 2,944,449 | 7/1960 | Wheeler et al. | 78—82 |
| 3,093,018 | 6/1963 | Rozmus | 78—82 |
| 3,134,278 | 5/1964 | Hollander et al. | 29—470.3 X |

FOREIGN PATENTS 1,265,578   5/1961   France.

OTHER REFERENCES

The Engineer's Digest, November 1957, vol. 18, No. 11, pp. 490 and 491.

Strojirenstvi, No. 9, 1957, pp. 681–686.

Zvaranie VI/4, 1957, pp. 105–109.

Zvaranie VI/11, 1957, pp. 327–329.

Zvaracsky Sbornik, Sav VI, 3, Bratislava, 1957, pp. 327–347.

JOHN F. CAMPBELL, *Primary Examiner.*